(12) United States Patent
Clisson

(10) Patent No.: US 9,420,143 B2
(45) Date of Patent: Aug. 16, 2016

(54) METHOD FOR WATER-MARKING DIGITAL BOOKS

(71) Applicant: Viaccess, Paris la Défense (FR)

(72) Inventor: Laurent Clisson, Domloup (FR)

(73) Assignee: Viaccess, Paris la Défense (FR)

( * ) Notice: Subject to any disclaimer, the term of this patent is extended or adjusted under 35 U.S.C. 154(b) by 0 days.

(21) Appl. No.: 14/412,853

(22) PCT Filed: Jul. 1, 2013

(86) PCT No.: PCT/EP2013/063768
§ 371 (c)(1),
(2) Date: Jan. 5, 2015

(87) PCT Pub. No.: WO2014/005966
PCT Pub. Date: Jan. 9, 2014

(65) Prior Publication Data
US 2015/0195421 A1    Jul. 9, 2015

(30) Foreign Application Priority Data
Jul. 3, 2012  (FR) ...................................... 12 56354

(51) Int. Cl.
*H04N 1/32*      (2006.01)
*G06T 11/60*    (2006.01)
(Continued)

(52) U.S. Cl.
CPC ........ *H04N 1/32144* (2013.01); *G06F 17/2217* (2013.01); *G06F 21/10* (2013.01); *G06T 1/0071* (2013.01); *G06T 11/60* (2013.01); *H04N 1/32272* (2013.01); *H04N 1/32304* (2013.01);

(Continued)

(58) Field of Classification Search
None
See application file for complete search history.

(56) References Cited

U.S. PATENT DOCUMENTS 6,661,417 B1 * 12/2003 Cheng ................... G06F 17/214
                                                                  345/469
6,782,509 B1   8/2004 Hirayama et al.
(Continued)

FOREIGN PATENT DOCUMENTS

WO         02103461        12/2002
WO        2011021114        2/2011

OTHER PUBLICATIONS

"Unicode font", Wikipedia, Dec. 26, 2011, Accessed on Dec. 8, 2015, Retrieved from: https://en.wikipedia.org/wiki/Unicode_font.*

*Primary Examiner* — Matthew Bella
*Assistant Examiner* — Brian Shin
(74) *Attorney, Agent, or Firm* — Occhiuti & Rohlicek LLP

(57) ABSTRACT

The method for water-marking digital books with parameters includes developing, for each parameter, a new typeface on the basis of a pre-existing typeface, by creating at least one new code/glyph pair. The method includes developing a new coded text on the basis of the pre-existing coded text by replacing, in the pre-existing coded text, at least one code or group of codes from the pre-existing typeface. The method further includes allowing display of a character or a combination of characters from the digital book by the code or the group of codes from the new typeface allowing display of the graphically identical character or combination of characters on any screen. The code/group of codes from the new typeface has/have at least the code from the new code/glyph pair. The method also includes providing the new coded text and the new typeface as a water-marked digital book.

11 Claims, 4 Drawing Sheets

(51) Int. Cl.
  *G06T 1/00* (2006.01)
  *G06F 21/10* (2013.01)
  *G06F 17/22* (2006.01)
(52) U.S. Cl.
  CPC ... *G06F 2221/074* (2013.01); *G06F 2221/0737* (2013.01); *G06F 2221/0746* (2013.01); *G06F 2221/0748* (2013.01); *G06T 2201/0062* (2013.01); *G06T 2201/0063* (2013.01); *G06T 2201/0064* (2013.01); *H04N 2201/327* (2013.01); *H04N 2201/3239* (2013.01)

(56) References Cited

U.S. PATENT DOCUMENTS

| | | |
|---|---|---|
| 2004/0001606 A1 | 1/2004 | Levy |
| 2011/0249897 A1* | 10/2011 | Chaki ............... G06K 9/34 382/177 |
| 2011/0276877 A1* | 11/2011 | Troyansky ........... G06F 17/241 715/257 |
| 2012/0139693 A1* | 6/2012 | Zucker ............... G06F 21/10 340/5.2 |

* cited by examiner

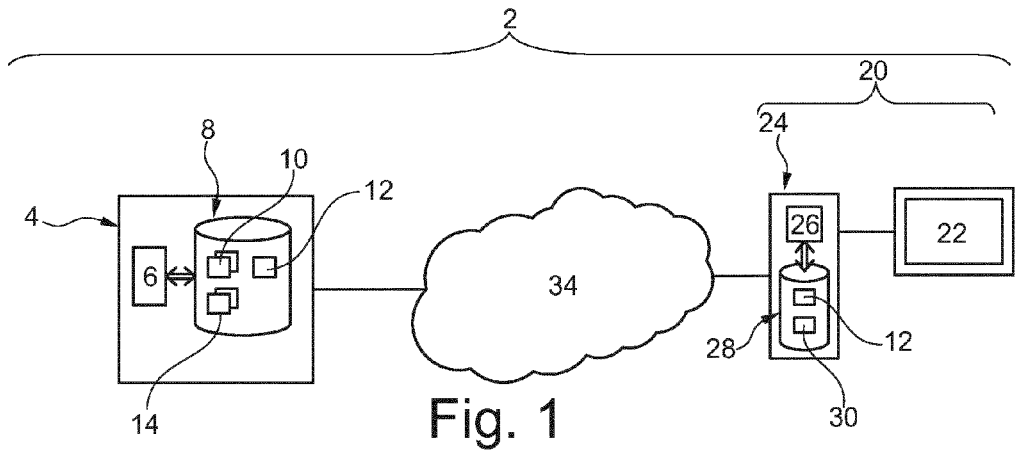
Fig. 1
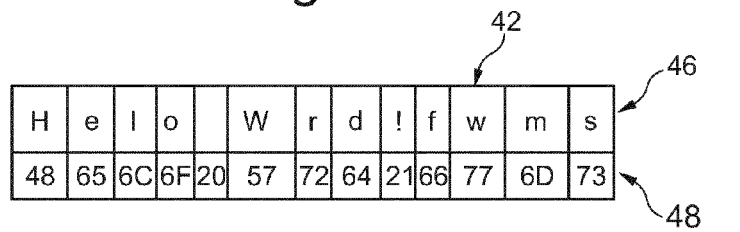
Fig. 2
Fig. 3
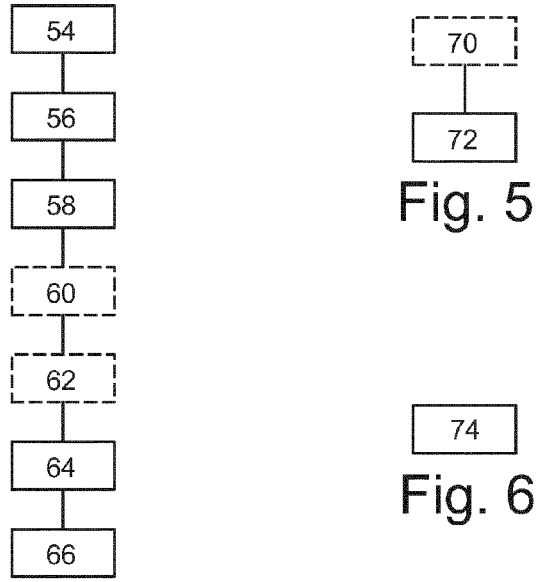
Fig. 4
Fig. 5
Fig. 6

METHOD FOR WATER-MARKING DIGITAL BOOKS

RELATED APPLICATIONS

This application is a U.S. National Stage of international application number PCT/EP2013/063768 filed Jul. 1, 2013, which claims the benefit of the priority date of French Patent Application FR 1256354, filed Jul. 3, 2012, the contents of which are herein incorporated by reference.

FIELD OF INVENTION

The invention relates to a method and a device for water-marking digital books with parameters linked by a bijective function to respective identifiers. The invention likewise relates to an information recording medium and to a computer program for implementing this method. Finally, the invention likewise relates to a set of digital books water-marked by means of the above method.

BACKGROUND

Water-marking methods are likewise known by the term "water-marking". The objective of these water-marking methods is to encode an identifier in the digital book in a manner that is not perceptible to users. This identifier is then used for, by way of example, identifying the user who has provided a copy of a digital book on multimedia content sharing networks. Thus, the water-marking of a digital book with an identifier from the purchaser may dissuade this purchaser from distributing the digital book that he has purchased for free.

A digital book contains a pre-existing text in which each character is coded by at least one code and a pre-existing typeface or a reference to a pre-existing typeface. Each typeface has code/glyph pairs. Each code/glyph pair associates a code from the coded text with a glyph that is used for displaying a character on a screen.

In microcomputing, since all styles and all bodies can be produced on the basis of the vectorial representation of a typeface, the term "typeface" denotes a type of character line, without taking account of the style, the boldness and the body. Type is understood to mean the form of the character line as identified by a name such as "Times", "Courier", "Arial", . . . etc.

"Style" denotes the degree of inclination of the characters such as inclinations known by the terms "roman" or "italic".

"Boldness" denotes the thickness of the line such as thicknesses known by the terms "light", "semi-bold", "bold".

"Body" denotes the size of the characters expressed in points such as 10, 12, 14, . . . etc.

A font is a set of glyphs, that is to say visual representations of characters, from one and the same typeface, having the same style, body and boldness. Thus, generally, a typeface comprises multiple fonts.

Usually, a typeface associates a code with each glyph from a character. The codes are generally defined by a standard such as the Unicode standard.

Equally, there are today several electronic formats of typefaces such as the TrueType and OpenType formats. These TrueType and OpenType formats are vector typeface formats.

A vector typeface is a typeface in which each glyph is defined not by a dot matrix image but rather by equations for one or more curves. The curves are typically Bézier curves.

With vector typefaces, it is possible to increase the size of the character without any step effect appearing when they are displayed.

Known water-marking methods for an identifier involve:
development of a new text on the basis of the pre-existing text, by replacing, in the pre-existing text, a first code from the pre-existing typeface with a second, different code from the pre-existing typeface, this second code being associated with a glyph that is very similar or identical to that associated with the first code, then
provision of the new text and of the pre-existing typeface as a water-marked digital book.

The first codes from the pre-existing text that are replaced by the second codes are selected as a function of the value of the identifier to be encoded. Thus, the new text has both first and second codes for displaying the same glyph on the screen or very similar glyphs. It is the position of the first and second codes, relative to one another, in the new text that encodes the value of the identifier in the digital book water-marked by this method.

Such a water-marking method is described in the application WO 2011/021 114, for example.

However, the known methods are not robust towards collusive attacks. Indeed, by comparing the coded text contained in various copies of the water-marked digital book with different identifiers, it is fairly simple to pinpoint the codes from the coded text that have been modified. This information is then used to reconstruct the original coded text, which does not have the water-marking. By way of example, this information makes it possible to replace the second codes with the first codes in order to reconstruct the original un-water-marked text.

The prior art likewise discloses:
WO02/103461 A2,
US2004/001606.

SUMMARY

The aim of the invention is to overcome this disadvantage. The object of the invention is therefore a method for water-marking digital books according to claim 1.

In the method above, the water-marked book displayed on any screen is graphically perfectly identical to the digital book containing the pre-existing text and the pre-existing typeface since the graphical representations of the characters are the same. Indeed, the new typeface is distinguished from the pre-existing typeface not by the graphical form of its characters but rather the coding of the glyphs. It is therefore not possible to distinguish the presence of an identifier in the displayed book.

In the new typeface, the code or codes used to obtain the graphical representation of a character are not all identical to that or those used in the pre-existing typeface in order to obtain the same graphical representation of the same character. Therefore, in the method above, the coding of the text is also modified to replace the pre-existing code with the corresponding code or codes from the new typeface. Thus, the method above associates the new coded text and the new typeface in inseparable fashion. Consequently, any attempt to remove the encoded identifier from the digital book by replacing the new typeface with another is in vain, since the coded text cannot be displayed correctly on the screen with another typeface. This also makes the water-marking method more robust towards other attempts to transform the digital book, for example copying and pasting the coded text.

Finally, the new typeface and the coded text are each dependent on the value of a parameter linked by a bijective function to the value of an identifier. They are therefore each unique for each value of the identifier. Under these circumstances, the method above is robust towards collusive attacks. In particular, it is not possible or much more difficult to remove or change the value of the encoded parameter in the book by comparing or combining various new coded texts that are each developed on the basis of parameters for which the values are different.

The embodiments of this water-marking method may have one or more of the features of the dependant water-marking method claims.

These embodiments of the water-marking method moreover have the following advantages:
- the development of the new typeface by replacing a code that is associated with a single glyph with another different code, makes it possible to create a new typeface without having to create or modify glyphs;
- the use of a permutation for the codes of the glyphs from the pre-existing typeface to create the new typeface makes it possible to very easily develop a new typeface that is very different from the pre-existing typeface;
- the development of the new typeface by adding a new glyph obtained by concatenating glyphs or pieces of glyphs from the pre-existing typeface or by dissecting a pre-existing glyph into several pieces makes it possible to very easily create a very large number of new, different typefaces;
- the creation of a glyph that differs from the same glyph from the pre-existing typeface solely by virtue of its vector coding makes it possible to code a complementary information item in a manner that is imperceptible in the new typeface;
- the recording of a digital print from the new typeface or from the new text associated with the value of the identifier makes it possible to easily find the value of this identifier on the basis of a copy of the new text or of the new typeface.

The invention likewise relates to an information recording medium or a computer program having instructions for implementing the above method when these instructions are executed by an electronic computer.

The invention likewise relates to a water-marking device according to claim 10.

The invention likewise relates to a set of water-marked digital books according to claim 11.

The invention will be better understood upon reading the description that follows, which is provided solely by way of nonlimiting example and with reference to the drawings.

BRIEF DESCRIPTION OF THE DRAWINGS

FIG. 1 is a schematic illustration of a system for distributing a digital book,

FIG. 2 is a schematic illustration of a coded text from the digital book, to be distributed by the system in FIG. 1, FIG. 3 is a schematic illustration of a typeface contained in the digital book to be distributed by the system in FIG. 1, FIG. 4 is a flowchart for a method for water-marking the digital book distributed by the system in FIG. 1, FIGS. 5 and 6 are flowcharts for methods allowing the value of the encoded identifier to be found in the water-marked digital book according to the method in FIG. 4, FIGS. 7 and 8 are schematic illustrations of a new typeface and a new text using this new typeface, respectively.

DETAILED DESCRIPTION

Figure 7:
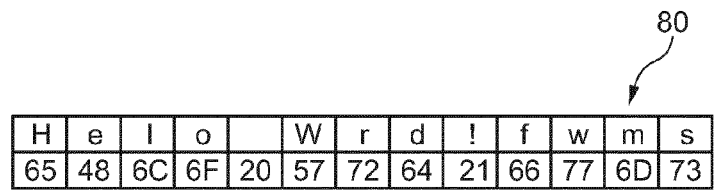

In these figures, the same references are used to denote the same elements.

In the rest of this description, the features and functions that are well known to a person skilled in the art are not described in detail.

FIG. 1 shows a system 2 for distributing digital books. This system 2 has a server 4 for digital books. The server 4 is equipped with a programmable electronic computer 6 that is capable of executing instructions recorded on an information recording medium. To this end, the computer 6 is connected to a memory 8. This memory 8 has the instructions that are necessary for executing the methods in FIGS. 4 to 6.

The memory 8 likewise has an original digital book 10 and a water-marked version of this digital book bearing the numerical reference 12. In contrast to the digital book 12, the original digital book 10 does not have an encoded parameter, linked to an identifier by a bijective function, in its content. In the rest of this description, the embodiments are described in the particular case in which the bijective function that links the value of the encoded parameter in the digital book to that of the identifier is the identity function. Thus, in the embodiments explained in detail below, the identifier is said to be directly encoded in the tattooed digital book.

In this case, the memory 8 likewise has a database 14. The database 14 associates, for each water-marked digital book, a digital print from the typeface incorporated in this book with the value of the water-marked identifier in this book. In this case, the water-marked identifier, denoted $Id_1$, has a value that is solely encodable over at least two bits of information and, preferably, over at least 8 or 10 bits of information. In this embodiment, the value of the identifier $Id_1$ makes it possible to uniquely identify the purchaser of the digital book among all of the purchasers of this book on the server 4.

The system 2 likewise has a multitude of terminals allowing the digital book 12 to be read on a screen. To simplify FIG. 1, just one terminal 20 is shown. The terminal 20 is equipped with an electronic screen 22 that allows the digital book 12 to be displayed in a manner that is directly visible and comprehensible to a human being. By way of example, the screen 22 is a touch screen.

The terminal 20 likewise has a central processor unit 24 for controlling and managing the display of the digital book on the screen 22. This central processor unit 24 has a programmable electronic computer 26 that is capable of executing instructions recorded on an information recording medium. To this end, the computer 26 is connected to a memory 28 containing the instructions that are necessary for displaying the digital book on the screen 22. In this case, the memory 28 likewise has a copy of the digital book 12.

More precisely, in order to display the digital book 12 on the screen 22, the memory 28 comprises the instructions from a reader 30. The reader 30 is a piece of software capable of displaying digital books on the screen 22 regardless of whether or not they have been water-marked beforehand. In this case, the reader 30 is a conventional piece of software that is capable of reading books in various formats such as one of the following formats: e-pub, PDF, ASCM or AZW. By way of example, the reader 30 is one of the readers known by the commercial names "Acrobat Reader®" or "Amazon Kindle®" or the like.

In this case, the digital book 12 is distributed between the server 4 and the terminal 20 by means of an information transmission network 34. By way of example, the network 34 is the global spider's web better known by the term "World Wide Web" or by the term "Internet".

In this embodiment, each digital book contains a coded text and a typeface for displaying this coded text.

A coded text is a succession of digital codes. In this case, the text of the digital book 10 is coded by using Unicode standard for this purpose. This standard notably defines what code is associated with each character. In the rest of this description and in the drawings, unless indicated otherwise, the values of the character codes are given in hexadecimals.

The typeface associates a glyph with each code from the coded text. To this end, it has as many code/glyph pairs as there are glyphs that can be displayed on a screen by using this typeface. A code/glyph pair is formed by a code from the coded text and by a reference to a series of instructions that can be executed by the reader in order to display a glyph on the screen. Thus, each code/glyph pair associates a code with a glyph in unique fashion. The instructions may involve a matrix image of the glyph such as a photograph, or a group of equations that define the graphical form of the glyph in vector fashion.

To illustrate the various water-marking methods described in the rest of the description, the way in which these methods work is shown in the particularly simple case in which the digital book 10 has a text 40 (FIG. 2), made up of a single phase: "Hello world! lord of worms!". The typeface of the digital book 10 is the typeface 42, only a portion of which is shown in FIG. 3. By way of example, the typeface 42 is the typeface known by the name "Arial".

In FIG. 2, each glyph in the text 40 is shown in a respective cell from a single row of a table. The coded text 44 corresponding to the text 40 is shown in a row just below the text 40. In this row, each code of a glyph is located inside a cell that is situated just below the cell containing this glyph. The succession of codes in the table of FIG. 2 forms the coded text 44.

In FIG. 3, only the glyphs used for displaying the text 40 are shown in respective cells from a row 46 of a table. The code associated with each glyph by the typeface 42 is held inside a respective cell that is situated just below the cell containing the corresponding glyph. These are cells from a row 48. In FIG. 3, each column thus forms a code/glyph pair of the typeface 42.

FIG. 4 shows a method for water-marking the identifier $Id_1$ in the book 10. This method will now be described in the particular case of the book 10 described with reference to FIGS. 2 and 3.

The method starts with a step 54 of identification of the pre-existing typeface used for displaying the book 10. The pre-existing typeface contains all of the codes that can be found in the coded text 44. Therefore, if necessary, during this step 54, the glyphs and codes that are not used in the coded text 44 are eliminated from the original typeface in order to obtain the pre-existing typeface.

In the particular case described here, the pre-existing typeface is identical to the typeface 42 shown in FIG. 3. Therefore, the pre-existing typeface is likewise denoted by the numerical reference 42 in this description.

Next, during a step 56, the computer 6 develops, as a function of the value of the identifier $Id_1$, a new typeface on the basis of the pre-existing typeface 42. For each different value of the identifier $Id_1$, the new typeface is different. Consequently, the new typeface is associated with the value of the identifier $Id_1$ by a bijective relationship. The new typeface differs from the pre-existing typeface in that it has at least one new code/glyph pair that differs from the code/glyph pairs that exist in the pre-existing typeface. Typically, this new code/glyph pair is distinguished from the existing code/glyph pairs by at least one of the following differences:

the glyph is a new glyph that does not exist in the pre-existing typeface, and/or the code is a new code that does not exist in the pre-existing typeface, and/or the code is associated with a different glyph that exists in the pre-existing typeface.

In this case, the new typeface is developed by replacing, in the pre-existing typeface, pre-existing code/glyph pairs with new code/glyph pairs or by adding new code/glyph pairs to the pre-existing code/glyph pairs. The new code/glyph pairs make it possible to display characters that are graphically identical to the characters that allow the pre-existing code/glyph pairs to be displayed. The function that creates the new typeface on the basis of the pre-existing typeface is subsequently denoted by $E_{Id}$. This function $E_{Id}$ is a parameterized function. In these embodiments, the parameter is the value of the identifier $Id_1$. The function $E_{Id}$ is a bijective function between the value of the identifier $Id_1$ and the new developed typeface.

In a step 58, the computer 6 develops a new coded text on the basis of the pre-existing coded text 44.

As indicated previously, the new typeface allows the display of characters that are graphically identical to those displayed using the pre-existing typeface. However, for that purpose, the new typeface allows the new code/glyph pair to be used. Thus, in order to display at least one character that is graphically identical to that displayed by means of the pre-existing typeface, one or more codes that are different from those used with the pre-existing typeface 42 are used. This or these code(s) used from the new typeface are called the "new codes". The code or codes used from the pre-existing typeface 42 in order to display the graphically identical characters are called the "old codes". With these names, step 58 consists in replacing, in the coded text 44, at least one occurrence of the old codes with new codes from the new typeface. This modification of the coded text 44 is made such that the new coded text displayed using the new typeface is graphically identical, when displayed on any screen, to the pre-existing text displayed using the pre-existing typeface on the same screen.

It will be noted that since the new typeface is unique for each value of the identifier $Id_1$, and since the new coded text is likewise unique for each value of the identifier $Id_1$, this method associates the new text and the new typeface in indissociable fashion. Indeed, it is not possible to correctly display the new text on the screen by using a typeface other than the new typeface.

Possibly, in a step 60, the computer 6 generates a digital print of the new typeface. The digital print is a summary of the new typeface. This summary allows the unique identification of the new typeface. Typically, the digital print is created by applying a hash function to the new typeface. The digital print takes up less space in memory than the new full typeface.

If the operation 60 is performed, then during an operation 62 the computer 6 records the generated digital print in the database 14 and associates it with the value of the identifier $Id_1$ that has been used to develop the new typeface.

Steps 60 and 62 are shown in dotted lines because they can be omitted. By way of example, these steps are omitted if it is possible to find the value of the identifier $Id_1$ on the basis of the new typeface and knowledge of the function $E_{Id}$ and the pre-existing typeface. Step 60 can also be omitted while retaining step 62. In this case, it is the new full typeface that is recorded in the base 14 associated with the value of the identifier $Id_1$ that is used to develop it.

In a step 64, the new book 12, containing the new typeface and the new coded text that are developed in the previous steps, is provided for the terminal 20 via the network 34.

Finally, in a step 66, the reader 30 displays the coded text from the digital book 12 on the screen 22. In this case, the coded text displayed from the digital book 12 is identical from a graphical point of view, when displayed on the screen 22, to that from the digital book 10.

If an illegal copy of the digital book 12 is found on file sharing network, the purchaser who has made this copy available on the network is identified by means of a method for decoding the identifier $Id_1$ encoded by the method in FIG. 4 in this digital book. FIG. 5 shows such a decoding method. In a step 70, the computer 6 generates the digital print of the typeface from the illegal copy of the book. For this purpose, it uses the same algorithm as that implemented in step 60.

Next, in a step 72, the computer 6 searches the base 14 for the value of the identifier $Id_1$ that is associated with the generated digital print. Thus, at the end of step 72, the value of the identifier $Id_1$ encoded in the illegal copy of the digital book is revealed. This thus makes it possible to identify the purchaser who has illegally distributed his copy of the digital book 12.

FIG. 6 shows another embodiment of the decoding method. During an operation 74, the computer 6 compares the typeface from the illegal copy of the book with the pre-existing typeface in order to identify the differences. By way of example, the pre-existing typeface is obtained on the basis of the book 10. Then, on the basis of these differences and using knowledge of the function $E_{Id}$ that is used, it finds the value of the identifier $Id_1$. Examples of implementation of this step 74 are provided further below. When the method in FIG. 6 is implemented, the base 14 can be omitted.

Various methods for developing the new typeface will now be described with reference to FIGS. 7 to 17.

A first method involves using a bijective function $E_{Id}$, parameterized by the value of the identifier $Id_1$, to permute the various codes that are present in row 48 of the pre-existing typeface 42. There are a very large number of possible permutations suitable such as circular permutations. In this case, this embodiment is illustrated using a simplified example in which the function $E_{Id}$ permutes a first and a second code from the typeface 42 so as to create two new code/glyph pairs. The two permuted codes are chosen as a function of the value of the identifier $Id_1$. By way of example, a pre-recorded table associates a first and a second code to be permuted from the typeface 42 with each possible value of the identifier $Id_1$. By way of example, the first rows of this table may be as follows:

| Value of the identifier $Id_1$ | 1st Code | 2nd Code |
| --- | --- | --- |
| 1 | 48 | 65 |
| 2 | 48 | 6C |
| 3 | 48 | 6F |
| 4 | 48 | 20 |
| 5 | 48 | 57 |
| 6 | 65 | 77 |
| 8 | 20 | 73 |

Thus, in the particular case in which the value of the identifier Id1 is equal to "1", the function $E_{Id}$ permutes the codes 48 and 65 from the typeface 42 in order to obtain the new typeface 80 shown in FIG. 7. In this typeface, the codes from the glyphs "H" and "e" have been permuted.

Figure 8:
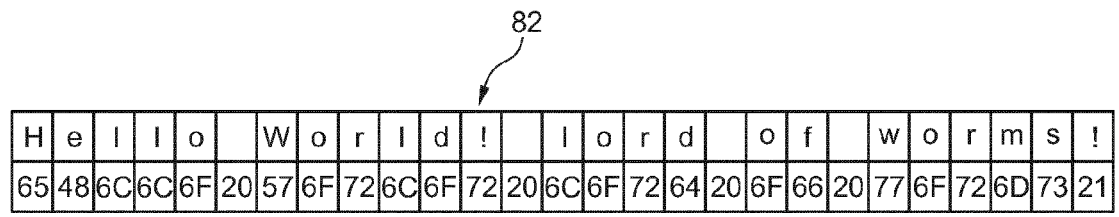
Figure 9:
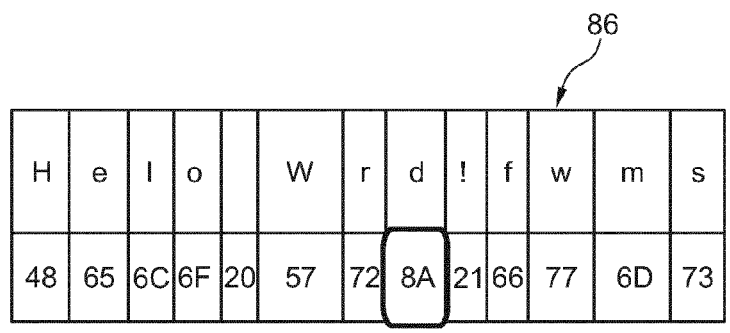
FIGS. 9, 10, 12, 14 and 17 are illustrations of new typefaces developed according to various methods that are capable of being implemented in the method in FIG. 4, FIGS. 11 and 13 are schematic illustrations of a text coded using the typefaces in FIGS. 10 and 12, respectively.

The new coded text developed on the basis of the typeface 80 is the coded text 82 shown in the table in FIG. 8.

It will be noted that if such a function $E_{Id}$ is implemented, it is not necessary to implement steps 60 and 62 in order to find the value of the identifier $Id_1$ on the basis of a copy of the water-marked digital book. Indeed, in step 74, by comparing the typeface 80 with the typeface 42, it is possible to identify the codes that have been permuted. Next, using the table above, it is possible to find the value of the identifier $Id_1$.

A second method for developing a new typeface 86 (FIG. 9) involves replacing one or more codes from the pre-existing typeface with new codes and thus creating new code/glyph pairs. In this case, the new typeface 86 is developed by replacing the old code associated with the glyph "d" with a new code for which the value is a function of the value of the identifier $Id_1$. By way of example, the value of the new code is taken to be equal to the value of the identifier $Id_1$ to which the hexadecimal number 0x80 is added. This new code is circled with a bold line in FIG. 9. The number 0x80 makes it possible to guarantee that the sum of this number and the value of the identifier $Id_1$ is never equal to another code from the typeface 42, because in the example all codes from the typeface 42 are less than this hexadecimal number 0x80.

As in the first method, the function $E_{Id}$ is such that it is possible to find the value of the identifier $Id_1$ by comparing the typefaces 42 and 86, and with knowledge of the function $E_{Id}$ that is used to develop the typeface 86.

Figure 10:
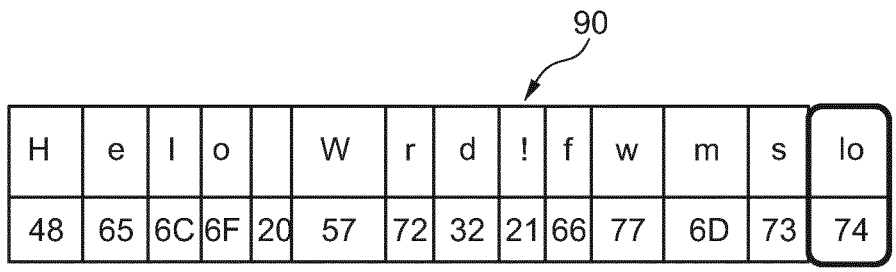

FIG. 10 shows a new typeface 90 that is obtained by implementing a third method for developing a new typeface. The third method involves generating a new glyph and adding it to the pre-existing typeface in order to obtain a new code/glyph pairs. The new glyph is in this case a concatenation of multiple glyphs from the pre-existing typeface 42. This concatenation must appear on the screen when the digital book 10 is displayed. By way of example, in the typeface 90, the new glyph "lo" is the concatenation of the glyphs "l" and "o" from the pre-existing typeface 42. A new code, in this case the code "0x74", that is different from the existing codes from the typeface 42, is associated with this new glyph "lo". The value of the new code and/or the new glyph are constructed as a function of the value of the identifier $Id_1$. By way of example, the glyphs from the pre-existing typeface 42 to be concatenated in order to create the new glyph are chosen as a function of the value of the identifier $Id_1$. In this case, the value of the code from this new glyph may be independent of the value of the identifier $Id_1$. Another possibility involves choosing the glyphs to be concatenated from the typeface 42 independently of the value of the identifier $Id_1$ and then assigning a code to the new glyph constructed in this manner, as a function of the value of the identifier $Id_1$.

Figure 11:
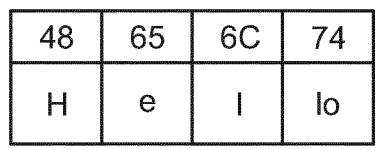

Next, in step 58, for at least one occurrence of the succession of the codes that correspond to the glyphs "l" and "o" in the coded text 44, this succession of codes is replaced with the new code "0x74" as illustrated in the table in FIG. 11. In this table, the first row represents the coded text and the second row shows the glyph associated with each code from the cell immediately above.

Figure 12:
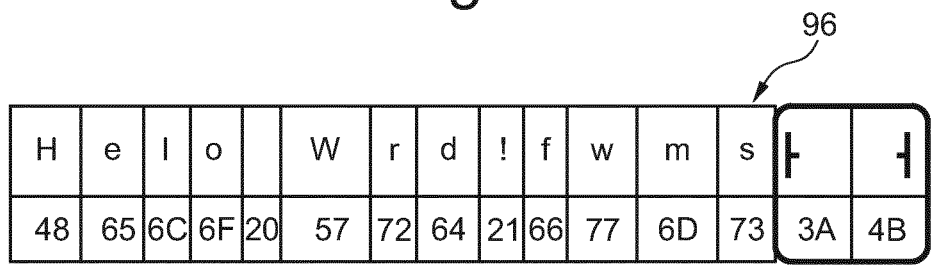

FIG. 12 shows a new typeface 96 that has been developed according to a fourth method. As previously, the fourth method involves adding new glyphs to the pre-existing typeface 42 in order to create new code/glyph pairs. In this case, the new glyph created is created by dissecting a glyph from the typeface 42, in this case the glyph "H", into multiple pieces. In the new typeface 96, the glyph "H" has been divided vertically into two glyphs that are symmetrical about a vertical axis of symmetry. The pieces corresponding to the left and right parts of the "H" are associated, respectively, with the codes 0x3A and "0x4B" in the new typeface 96. The glyph "H" in a single piece can be deleted in order to force the use of the glyphs associated with the codes 0x3A and 0x4B.

The value of the identifier is used in this fourth method in order to perform one or more of the following tasks:

selecting the glyph from the pre-existing typeface to be dissected into multiple pieces, and/or selecting the manner of dissecting the glyph from the pre-existing typeface, and/or generating the values of the codes associated, in the new typeface 96, with each piece of the glyph that has been created.

An example of a manner, parameterized by the value of the identifier $Id_1$, of dissecting the glyph is as follows: depending on the value of the identifier $Id_1$, the axes along which the letter H is dissected are not the same.

Figure 13:
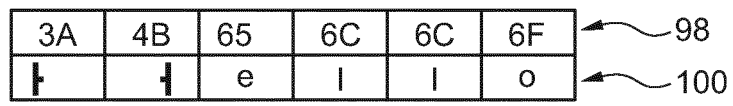

FIG. 13 shows the text "Hello" coded with the typeface 96. The coded text can be found in row 98 and the glyphs associated with each code can be found in row 100.

The new coded text is developed by replacing at least one occurrence of the code 48 with the succession of codes 0x3A and 0x4B.

When one or more new glyphs are added to the pre-existing typeface, this makes it possible to obtain a new typeface in which the glyphs are redundant. By way of example, in the typeface 96, the glyph in which the code is 0x48 is redundant with the succession of glyphs of code 0x3A and 0x4B. This redundancy can be used in order to encode a complementary information item. Typically, the complementary information item is different from the value of the identifier $Id_1$. By way of example, the complementary information item may be an identifier from the reseller or from the distributor of the digital book. However, if the aim is to encode the value of the identifier $Id_1$ in the same digital book in two different manners, the complementary information item can be taken to be equal to the value of the identifier $Id_1$.

By way of example, the first occurrence of an "H" in the text is replaced by the codes 0x3A and 0x4B only if the first bit of this complementary information item is equal to "1". Next, the second occurrence of an "H" in the text is replaced by the codes 0x3A and 0x4B only if the second bit of this complementary information item is equal to "1", and so on. It is assumed in this example that the complementary information item to be encoded is different from zero such that the new coded text is different from the old.

Figure 14:
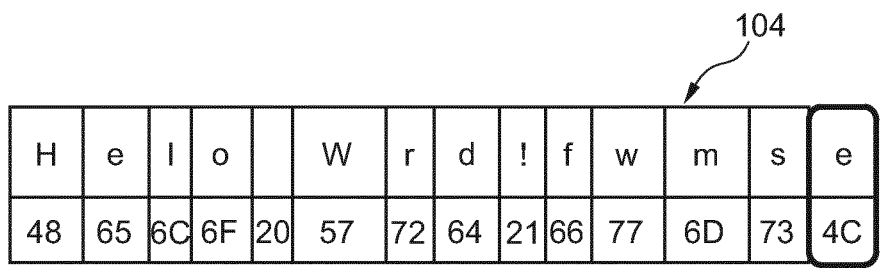

FIG. 14 shows a new typeface 104 that has been developed according to a fifth method. The fifth method involves duplicating a glyph from the typeface 42 and associating it with a new code in order to obtain a new code/glyph pair. In this case, the duplicated glyph is the glyph "e". The choice of the duplicated glyph and/or the value of the new code from this duplicated glyph are a function of the value of the identifier $Id_1$. The redundancy thus introduced into the new typeface 104 can be used in order to encode a complementary information item, for example, as described above.

The fourth and fifth methods have been used to illustrate the fact that redundancy in the new typeface was able to be used in order to encode a complementary information item in the coded text. The complementary information item is encoded in the coded text because modification of the value of the complementary information item brings about only a modification of the coded text and not a modification of the new typeface.

Figure 15:
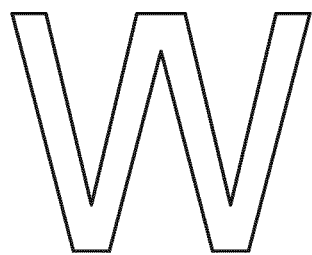
FIGS. 15 and 16 are schematic illustrations of one and the same glyph defined by two different vector codings.
Figure 16:
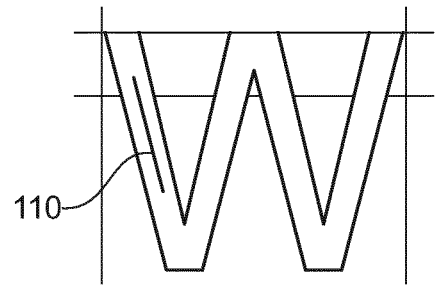

In addition to the identifier $Id_1$, it is likewise possible to encode a complementary information item in the glyphs from the new typeface. By way of example, it is assumed that the pre-existing typeface is a vector typeface in which each glyph is defined by curve equations. Typically, these are Bézier curves. In this case, the complementary information item can be coded by modifying the equations that define a glyph without this modification being perceptible when the glyph is displayed on a screen. By way of example, FIG. 15 shows the glyph "W" defined by a set of equations in the pre-existing typeface 42. FIG. 16 shows the same glyph "W" defined by a new set of equations in the new typeface developed according to this method. The new set of equations is identical to that for the pre-existing typeface, except that it has an additional equation defining a line 110 (FIG. 16). The line 110 is accommodated inside the thickness of the letter "W" from the typeface 42. Moreover, the line 110 is of the same colour as the letter "W" from the typeface 42. Thus, on a screen, the line 110 is imperceptible. By contrast, the set of equations for the glyph "W" in the new typeface is different from the set of equations defining this very same glyph in the pre-existing typeface. The presence or absence of the line 110 is thus used to code a complementary information item. By way of example, the complementary information item is coded by using a line 110 for which the length is different for each different value of the complementary information item to be encoded. In this case, the complementary information item is only encoded in the glyphs because a modification of the value of the complementary information item only brings about a modification of one or more glyphs from the new typeface.

The various method described above for developing a new typeface can be combined so as to obtain a more complex function $E_{Id}$.

Figure 17:
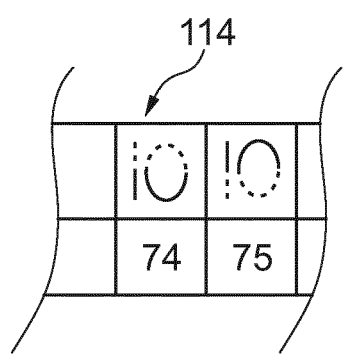

By way of example, the methods described with reference to FIGS. 10 and 12 are combined in order to add glyphs to the typeface that are concatenations of various pieces of various glyphs from the pre-existing typeface. By way of example, FIG. 17 shows an extract from a new typeface 114. This new typeface 114 has been developed on the basis of the typeface 42 by successively applying the third and fourth methods. The application of the third method results in the creation of an intermediate glyph "lo". Next, the fourth method has been applied to this intermediate glyph "lo" in order to split it in two along a horizontal axis, and thus to obtain two new glyphs corresponding to the codes 0x74 and 0x75 in the new typeface 114. In FIG. 17, the missing pieces for reconstructing the full glyph "lo" are shown in dotted lines. In the new coded text, the codes corresponding to the succession of the glyphs "l" and "o" have been replaced by the codes 0x74 and 0x75.

Numerous other embodiments are possible. By way of example, the order of steps 56 and 58 can be reversed in some embodiments. Thus, the encoding of the identifier in the original text can be performed before the new typeface is developed. Thus, as a variant, the codes from the characters in the coded text 44 are first of all permuted as a function of the value of the identifier $Id_1$, and then same permutation is performed in the codes from the typeface 42 in order to develop the new typeface.

Numerous other embodiments exist for developing a new typeface and a new unique text as a function of the value of the identifier $Id_1$. By way of example, in the second method of development, the glyph for which the code has been modified can be selected as a function of the value of the identifier $Id_1$. By way of example, one portion of the bits of the value of the identifier $Id_1$ is used to select the glyph from the pre-existing typeface for which the code will be modified, and another portion of the bits of this very identifier $Id_1$ is used to generate the new code that replaces the old code. In another embodiment, the value of the new code is independent of the value of the identifier, and only the selected glyph is a function of the value of the identifier $Id_1$.

Other methods for creating new glyphs are possible. By way of example, it is possible to create a new glyph that results from the concatenation of a full glyph from the pre-existing typeface with a piece only from another glyph from this very same pre-existing typeface.

In another variant, the new glyph created is a function of the value of the identifier $Id_1$. By way of example, the function of dissecting a glyph from the pre-existing typeface into multiple glyphs is parameterized with the value of the identifier $Id_1$.

A new glyph can likewise be created by concatenating multiple glyphs or portions of glyphs from the pre-existing typeface, but defined with vector coding that is different from the vector coding of these very pieces of glyphs in the pre-existing typeface. This thus does not modify the display of these pieces of glyphs on the screen.

Character coding standards other than the Unicode standard can be used. By way of example, the ASCII standard can be used.

The typeface is not necessarily incorporated into the digital book. By way of example, the digital book contains only the coded text and a reference to a typeface which needs to be installed on the reading terminal before the text can be displayed. In this embodiment, the typeface and the text of the water-marked digital book are not necessarily distributed at the same time. By way of example, the typeface developed on the basis of the identifier $Id_1$ is first of all developed and then transmitted to the reader. Next, each purchased text is water-marked with the same identifier $Id_1$ from the purchaser, and then transmitted to the reader. However, whenever a new digital book is water-marked for the same purchaser, it is not necessary to continue again by developing the new typeface since said reader already has a copy of this new typeface. In this embodiment, preferably, step 54 is omitted so that the typeface transmitted to the terminal 20 can be used with a very large number of different digital books.

The identifier $Id_1$ encoded in the digital book may have various uses. By way of example, it can be used to identify the editor of the digital book in unique fashion or to identify the digital book itself. By way of example, the identifier $Id_1$ identifies the distributor of the digital book and a complementary information item encoded by this distributor identifies the purchaser.

The pre-existing typeface is not necessarily the typeface from the original digital book but rather only the typeface on the basis of which the new typeface is developed. By way of example, the water-marking method described previously can be implemented a first time in order to water-mark an identifier $Id_R$ from a reseller in a copy of the original digital book. Then, each time the reseller sells the digital book to a purchaser, he also implements the method in FIG. 4 in order to water-mark the copy of the digital book with an identifier $Id_1$ from the purchaser. For water-marking with the identifier $Id_1$, the pre-existing typeface is the typeface developed for the reseller, rather than the original typeface.

As a variant, it is not the new typeface or the digital print of the new typeface that is associated with the value of the identifier $Id_1$ in the database 14 but rather the new text or a digital print of this new text. Indeed, like the new typeface, the new text is linked to the value of the identifier $Id_1$ by a bijective relationship. The digital print recorded in the database 14 can also be generated on the basis of both the new typeface and the new text.

When the new code/glyph pair from the new typeface has a new glyph, the digital print of the new typeface can be generated by constructing a summary solely on the basis of the set of graphical elements of the glyphs from the new typeface without taking account of the codes associated with said glyphs. Since each glyph is graphically coded with a digital series of values (simple dot matrix, or vector coordinates), this summary can be obtained by applying a hash function to all of the selected digital series. The hash function is preferably cryptographical such as MD5 or, alternatively, is a checksum such as CRC64. In this embodiment, the digital print associated with the value of the identifier $Id_1$ has the value of the summary that has been obtained and a possible key if the hash function is cryptographical. This makes it possible to make the water-marking method even more robust towards modifications such as code permutations between the glyphs with the aim of making it impossible to recognize the identifier $Id_1$. Alternatively, the summary is a coded representation of the sequence of modifications implemented for moving from the pre-existing typeface to the new typeface.

The decoding of the value of the identifier $Id_1$ encoded in a digital book is not necessarily performed on the same machine as that used for water-marking this book.

In other embodiments, it is not the identifier $Id_1$ that is directly encoded in the digital book but rather the value of a parameter $P_1$. The value of the parameter $P_1$ that is encoded in the digital book is thus linked to the value of the identifier $Id_1$ by a different bijective function of the identity. By way of example, each different value of the parameter $P_1$ is associated, in a database, with a respective value of the identifier $Id_1$. In this case, it is possible first of all to construct the new typefaces corresponding to the various possible values of the parameter $P_1$ without knowing the values of the identifiers $Id_1$ associated with each of the values of the parameter $P_1$ at that instant. Next, following development of the new typefaces, it is possible to associate each new typeface with the value of an identifier $Id_1$. By way of example, the database 14 is only constructed at that instant.

The method described with reference to FIGS. 15 and 16 for encoding a complementary information item in the equations defining a glyph can be implemented independently of the methods described for encoding the identifier $Id_1$ or the parameter $P_1$.

The invention claimed is:

1. A method for water-marking a digital book with parameters linked by a bijective function to respective identifiers, the digital book containing a pre-existing coded text in which each character is coded by at least one code and a pre-existing typeface or a reference to a pre-existing typeface, each typeface having code/glyph pairs, each code/glyph pair associating a code from the pre-existing coded text with a glyph used for displaying a character, wherein the method comprises the steps:

of developing, for each parameter, a new typeface on a basis of the pre-existing typeface, by creating at least one new code/glyph pair that is different from the existing code/glyph pairs in the pre-existing typeface, this new code/glyph pair being distinguished from the existing code/glyph pairs by at least one of the following differences:

the glyph is a new glyph that does not exist in the pre-existing typeface, or the code is a new code that does not exist in the pre-existing typeface, or the code is associated with a different glyph that exists in the pre-existing typeface, the new glyph or the new code or the new code/glyph pair association being a function of a value of the parameter such that the new typeface is different for each different value of the identifier, of developing a new coded text on the basis of the pre-existing coded text by replacing, in the pre-existing coded text, at least one code or group of codes from the pre-existing typeface allowing display of a character or a combination of characters from the digital book by the code or group of codes from the new typeface allowing display of a graphically perfectly identical character or combination of characters on any screen, this code or this group of codes from the new typeface having at least the code from the new code/glyph pair such that the new coded text developed in this manner is different for each different value of the identifier, of providing the new coded text and the new typeface or a reference to the new typeface as a water-marked digital book.

2. The method according to claim 1, in which developing the new typeface involves replacement of a code associated with a glyph in the pre-existing typeface by another different code, in order to create a new code/glyph pair, the value of the other code and/or the choice of the glyph from the pre-existing typeface from which the code is replaced being a function of the value of the parameter.

3. The method according to claim 2, in which replacing a code from the pre-existing typeface by another code in order to develop the new typeface comprises a permutation of a plurality of the codes from the pre-existing typeface so as to create the new code/glyph pairs allowing display of the same glyphs as the pre-existing typeface, the permutation used being a function of the value of the parameter.

4. The method according to claim 1, in which developing the new typeface comprises:—a creation of a new glyph that is identical, when displayed on any screen, to a concatenation of a plurality of glyphs from the pre-existing typeface, and—an association of a code with this new glyph, the new created glyph or the value of the code from this new glyph being a function of the value of the parameter.

5. The method according to claim 1, in which the development of the new typeface comprises:

a creation of a plurality of new glyphs, each of these new glyphs having at least one piece only of one and the same glyph from the pre-existing typeface so that the superposition of these new glyphs constitutes a glyph that is identical, when displayed on any screen, to this glyph from the pre-existing typeface, an association of a code with each of these new glyphs, the new created glyph or the value of the code from this new glyph being a function of the value of the parameter.

6. The method according to claim 1, in which the development of the new typeface comprises the creation of a glyph that is identical, when displayed on any screen, to a glyph or to a combination of glyphs from the pre-existing typeface but defined by a vectorial coding that is different from the vectorial coding used for this glyph or this combination of glyphs in the pre-existing typeface, the different vectorial coding being linked by a bijective function to the value of a complementary information item that is encoded in the water-marked digital book.

7. The method according to claim 1, in which the method involves the recording, in a database, of the value of the identifier linked by the bijective function to the value of the parameter used for developing the new typeface, which value is associated with the new typeface or with the new coded text or with a digital print from the new typeface or with a digital print from the new coded text.

8. The method according to claim 1, in which the value used for the parameter is solely encodable in binary over a plurality of bits.

9. A tangible and non-transitory information recording medium, comprising instructions for the execution of the method according to claim 1 when these instructions are executed by an electronic computer.

10. A device for water-marking digital books with parameters linked by a bijective function to respective identifiers, the digital book comprising a pre-existing coded text in which each character is coded by at least one code and a pre-existing typeface or a reference to a pre-existing typeface, each typeface having code/glyph pairs, each code/glyph pair associating a code from the coded text with a glyph that is used for displaying a character, this device having:—an information recording medium, and—a programmable electronic computer, capable of executing instructions recorded on the information recording medium, wherein the information recording medium has instructions for implementing a method according to claim 1 when these instructions are executed by the electronic computer.

11. A set of water-marked digital books that is obtained by implementing a method according to claim 1, each of these water-marked digital books being capable of displaying a text, on any screen, that is graphically perfectly identical to the text displayed by the other digital books from this set when this book is read by an electronic reader, each digital book containing, to this end:

a coded text in which each character is coded by at least one code;

a typeface or a reference to a typeface that is used for displaying the coded text on a screen, each typeface having code/glyph pairs, each code/glyph pair associating a code from the coded text with a glyph that is used for displaying a character, wherein:

the typeface of each digital book has at least one different code/glyph pair that is distinguished from the existing code/glyph pairs in the typefaces of the other digital books from the set by at least one of the following differences:

the glyph is a new glyph that does not exist in the typefaces of the other digital books from the set, or the code is a new code that does not exist in the typefaces of the other digital books from the set, or the same code is associated with other, different glyphs in the typefaces of the other digital books from the set, the coded text from each digital book has at least the code from the different code/glyph pair from its typeface, the text coded in this manner being different from the coded texts of the other digital books from the set.

* * * * *